United States Patent [19]
Matsushita et al.

[11] Patent Number: 5,833,871
[45] Date of Patent: Nov. 10, 1998

[54] METHOD OF FINISHING THE SURFACE OF A FLOATING TYPE MAGNETIC HEAD

[75] Inventors: Takeshi Matsushita; Shinya Ibaraki; Shigeyuki Adachi, all of Shizuoka-ken, Japan

[73] Assignee: Minebea Co., Ltd., Kitasaka-gun, Japan

[21] Appl. No.: 889,006

[22] Filed: Jul. 7, 1997

Related U.S. Application Data

[63] Continuation of Ser. No. 441,938, May 16, 1995, abandoned.

[30] Foreign Application Priority Data

Jul. 21, 1994 [JP] Japan ..................... 6-191172

[51] Int. Cl.⁶ .............. G11B 5/187; G11B 5/60
[52] U.S. Cl. ................. 216/22; 216/96; 216/97; 216/103; 216/108
[58] Field of Search ................ 216/22, 96, 97, 216/102, 103, 108

[56] References Cited

U.S. PATENT DOCUMENTS

| | | | |
|---|---|---|---|
| 4,322,264 | 3/1982 | Rioult et al. | 156/655 |
| 4,985,306 | 1/1991 | Morizane et al. | 428/410 |
| 5,079,657 | 1/1992 | Aronoff et al. | 360/103 |
| 5,303,100 | 4/1994 | Nakayama et al. | 360/104 |
| 5,468,343 | 11/1995 | Kitano | 156/656.1 |

FOREIGN PATENT DOCUMENTS

| | | |
|---|---|---|
| 2-276074 | 11/1990 | Japan . |
| 2-310869 | 12/1990 | Japan . |
| 4-34203 | 2/1992 | Japan . |

*Primary Examiner*—Kathryn L. Gorgos
*Assistant Examiner*—William T. Leader
*Attorney, Agent, or Firm*—Oliff & Berridge, PLC

[57] ABSTRACT

In a method of finishing a surface of a floating type magnetic head in which a sliding contact surface opposing a magnetic recording medium is made of a polycrystal material comprising at least two kinds of phases of different compositions mixed together, the sliding contact surface is roughened by treatment with an etching solution in accordance with a chemical etching process. The sliding contact surface of the floating type magnetic head can be mirror-finished with an appropriate surface roughness, so that satisfactory CSS performance and good electromagnetic performance can be obtained. The sliding contact surface is preferably made of a polycrystal ceramic material selected from the $CaTiO_3$ ceramic system, the AlTiC ceramic system and the MnO-NiO ceramic system. The etching solution contains aqueous hydrogen peroxide as an oxidizing agent and is preferably an aqueous hydrogen peroxide and ammonia solution.

5 Claims, 5 Drawing Sheets

(NH$_4$OH : H$_2$O$_2$ = 1 : 20)
(ETCHING TIME PERIOD = 10 min)

METHOD OF FINISHING THE SURFACE OF A FLOATING TYPE MAGNETIC HEAD

This is a Continuation of application Ser. No. 08/441,938 filed May 16, 1995 now abandoned.

BACKGROUND OF THE INVENTION

1. Field of the Invention

The present invention concerns a floating type magnetic head used for a magnetic recording device such as a magnetic disc device and, more in particular, it relates to a method of finishing a surface of a floating type magnetic head in sliding contact with a magnetic disc or the like to an appropriate surface roughness. The present invention also relates to a floating type magnetic head applied with such surface finishing.

2. Description of the Prior Art

A static magnetic disc device usually employs a contact start and stop (hereinafter simply referred to as CSS) system and a magnetic head rises from a magnetic disc under the effect of hydrodynamic air bearing during high speed rotation of the disc and the magnetic head is lowered and brought into sliding contact with the magnetic disc when the rotation stops.

For obtaining good electromagnetic conversion characteristic for the magnetic device of this type, it is basically required that the sliding contact surface of the magnetic head opposing to the magnetic disc is mirror-finished at a high accuracy to ensure a stable floating characteristic of the magnetic head.

On the other hand, if the sliding surface is completely mirror-finished, the sliding surface of the magnetic head sticks to the surface of the magnetic disc upon stopping of the device, so that the CSS performance of the magnetic disc is lowered to shorten the lifetime of the device. This is attributable to a remarkable improvement for the accuracy at the surface of the magnetic disc by plating or sputter finishing in recent years. Furthermore, a significant problem causes the lowering of CSS performance to a recent low torque motor which has been used for driving the magnetic disc in order to reduce electric power consumption.

Accordingly, in order to maintain the good electromagnetic conversion performance ensure the satisfactory CSS performance, it is required that the sliding contact surface of the floating type magnetic head opposing to the magnetic disc is mirror-finished with some surface roughness.

That is, after mirror-finishing the sliding contact surface of the magnetic head by polishing (usually 10 to 40 angstrom surface roughness), the mirror-finished sliding contact surface is roughened to some extent.

For coping with such a demand, several methods have been proposed so far. One of them is a method of etching a floating surface of a polished magnetic head by a reactive ion etching process to provide a somewhat roughened surface as described in Japanese Patent Publication Hei 4-34203. In another method, as disclosed in Japanese Patent Laid-Open Hei 2-276074, after mirror-finishing a sliding contact surface of a head slider opposing to a recording medium, bias sputtering is applied to provide a surface having 50–100 angstrom pits for instance formed thereon.

However, in the former method, an expensive plasma etching device is needed, and since it is necessary to reduce the pressure inside the device, in which a magnetic head is placed before etching, to $10^{-5}$ torr or below to keep a stable plasma discharge, it involves a longer evacuation time, thus longer operation time, and poor productivity.

Also in the latter method, use of a special equipment for conducting bias sputtering generally belonging to dry etching technique is inevitable, and it is necessary, like that the former method, to reduce the pressure inside of a chamber in which the magnetic head is placed usually to about $10^{-3}$ Torr before the treatment (so-called evacuation), so that it involves a problem in view of the workability and the productivity.

A different method has also been proposed. This is a method, as disclosed in Japanese Patent Laid-Open Hei 2-310869, of treating a surface of a floating type magnetic head comprising an unevened polycrystal material opposing to a magnetic recording medium to a predetermined surface roughness by using chemical etching process.

Since the method is a wet etching process, it requires no special expensive facility is required and relatively short operation time is needed.

However, the above-mentioned method is applicable only to limited kind of magnetic heads using magnetic ceramic material such as Mn-Zn ferrite and Ni-Zn ferrite as a slider material (that is general monolithic type magnetic head) as mentioned in Japanese Patent Laid-Open Hei 2-310869.

Today, non-magnetic ceramics such as of $CaTiO_3$ system, AlTiC system and MnO-NiO system are often used as the slider material for the magnetic head, in addition to magnetic ceramics such as the ferrites described above. From the view point of reducing inductance, it is considered that the non-magnetic ceramics will become predominant as the slider constituent material for the magnetic head.

Accordingly, it has been required to develop a surface finishing method capable of roughening the sliding contact surface of a slider composed of non-magnetic ceramic by wet etching.

OBJECT AND SUMMARY OF THE INVENTION

The present invention has been accomplished for coping with such a demand and an object thereof is to provide a method capable of finishing a sliding contact surface of a floating type magnetic head, aspecially a magnetic head in which a sliding contact surface thereof opposing to a magnetic recording medium is made of a polycrystal material comprising at least two kinds of phases of different compositions mixed together, for example, non-magnetic polycrystal ceramic into a mirror face having an appropriate surface roughness.

In other words, the present invention is to provide a method of finishing a sliding contact surface of a floating type magnetic head opposing to a magnetic recording medium, capable of maintaining a good electromagnetic performance and ensuring a satisfactory CSS performance.

A further object of the present invention is to provide a floating type magnetic head in which a sliding contact surface with a magnetic recording medium is finished by the method described above.

The feature of the present invention resides in a method of finishing the surface of a floating type magnetic head in which a sliding contact surface thereof opposing to a magnetic recording medium (magnetic disc, magnetic drum or the like) is made of a polycrystal material having at least two kinds of phases of different compositions mixed together, by roughening the sliding contact surface by using an etching solution in accordance with chemical etching.

The floating type magnetic head as an object of the present invention is a magnetic head in which the sliding contact surface of a slider opposing to a magnetic recording medium (a surface generally referred to as a bearing surface) comprises at least two kinds of phases of different compositions mixed together which is, for example, a composite type magnetic head and also a side core type magnetic head recently developed.

In addition, the method of the present invention is also applicable also to a laminate type magnetic head not using ferrite, among monolithic magnetic heads (using metal such as sendust for magnetic material).

As the polycrystal material comprising at least two kinds of phases of different compositions mixed together generally include polycrystal materials of non-magnetic ceramics such as of $CaTiO_3$ ceramic system, AlTiC ceramic system, MnO-NiO ceramic system, and $CaTiO_3$-NiO ceramic system. However, polycrystal materials such as Mn-Zn ferrite and Ni-Zn ferrite are not included in the polycrystal material in the present invention.

In a preferred embodiment, the present invention provides a method of finishing the surface of a floating type magnetic head by treating the sliding contact surface of the floating type magnetic head opposing to a magnetic recording medium with an etching solution into a roughened surface in accordance with a chemical etching process, the sliding contact surface being made of non-magnetic ceramics selected from the group consisting of polycrystal $CaTiO_3$ system, AlTiC system, MnO-NiO system and $CaTiO_3$-$NiO_3$ ceramics and, more preferably, polycrystal $CaTiO_3$ ceramics system.

In a preferred embodiment of the method of finishing the surface according to the present invention, the sliding contact surface is treated in accordance with the chemical etching process by using an acid or alkaline solution containing an oxidizer as an etching solution.

The acid solution applicable to the present invention are a solution of acid such as hydrofluoric acid, diluted hydrochloric acid, concentrated hydrochloric acid, phosphoric acid, hot phosphoric acid, concentrated sulfuric acid, sulfuric acid+phosphoric acid (preferably under heated condition), acetic acid, nitric acid, nitric acid+phosphoric acid, hypochlorous acid, tartaric acid and citric acid. The alkaline solutions applicable to the present invention are sodium hydroxide, potassium hydroxide, hydrazine, ethyldiamine and ammonia. More specifically, 0.01N hydrochloric acid, 10N phosphoric acid, 0.5M tartaric acid, 0.5M citric acid, 1N potassium hydroxide, 0.5N sodium hydroxide and about 0.1 to 10N ammonia.

Among the solutions described above, preferred are aqueous solutions of hydrochloric acid, phosphoric acid, tartaric acid, citric acid, potassium hydroxide, sodium hydroxide and ammonia. Particularly preferred are aqueous solutions of potassium hydroxide, tartaric acid, citric acid and ammonia, aqueous ammonia being particularly preferred.

Applicable oxidizers in the present invention are; ozone, permanganic acid, chromic acid and oxo acid, as well as various kinds of peroxides, for example, peracetic acid, benzoyl peroxide, and hydrogen peroxide. Among them, the peroxides as described above are preferred, aqueous hydrogen peroxide being particularly preferred.

Accordingly, in a most preferred embodiment for the method of the present invention, an aqueous hydrogen peroxide/ammonia solution is used as the etching solution.

The acid or alkaline solution and oxidizer described above should be selected properly in accordance with the nature of the slider constituent materials of the floating type magnetic head, namely, depending on the kind of the polycrystal materials constituting the sliding contact surface opposing to the magnetic recording material.

For the chemical etching method in the present invention, any of chemical etching methods used so far can be utilized properly. Namely, chemical etching in the present invention is usually applied by dipping a floating type magnetic head entirely in an etching solution controlled to a predetermined concentration for a predetermined period of time. Accordingly, the method of the present invention is advantageous in that the etching treatment can be applied at a moderate temperature such as room temperature.

In another aspect, the present invention also relates to a floating type magnetic head in which the sliding contact surface with the magnetic recording medium is finished by a chemical etching process in various modes described previously.

PREFERRED EMBODIMENTS OF THE INVENTION

The present invention will be described more in details referring to preferred embodiments.

EXAMPLE 1

Figure 1:
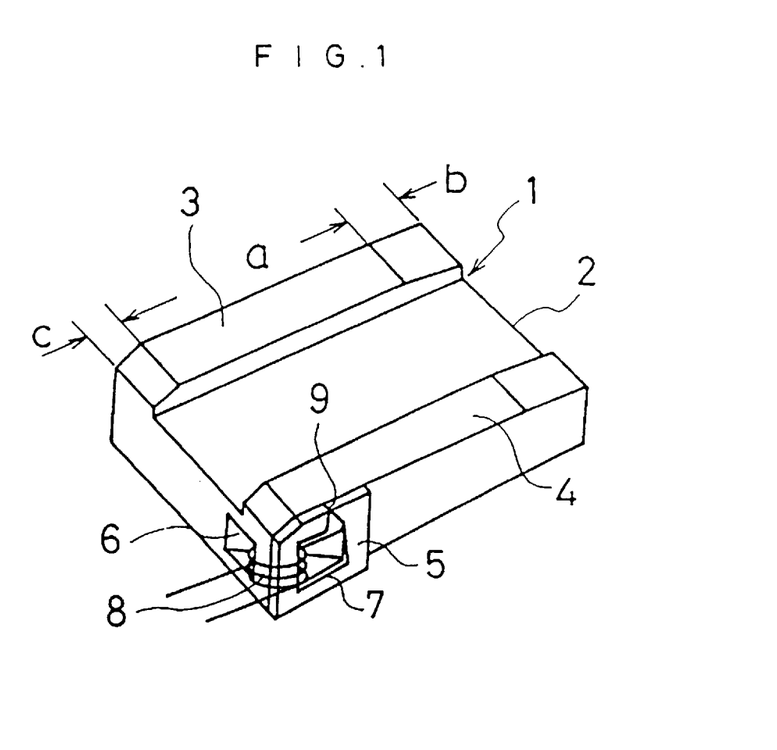
FIG. 1 is a perspective view illustrating a side-core type magnetic head used in a method of a preferred embodiment according to the present invention.

This embodiment is an example of a method of finishing a surface applied to a side core type magnetic head 1 as shown in FIG. 1.

In the illustrated floating type magnetic head 1 ridged bearing surfaces 3 and 4 are formed in parallel with each other on an upper surface of a slider 2, and a thin plate core 5 is bonded to the surface side of the slider 2 at a rear end of one bearing surface 4. Bonding is conducted by using a bonding agent made of low melting glass, epoxy resin adhesive or eutectic metal such as Au-Sn, Au-Ge.

The slider 2 has a channel 6 formed from the rear end face to the outer side-surface, which is in coincides with the central window 7 of the core 5 attached on the outer side surface. Windings 8 are applied by a predetermined number of turns passing through the channel 6 and the window 7.

The core 5 has a read/write gap 9 and a magnetic alloy layer of high magnetic permeability can be formed to the surface of the gap 9. As the magnetic alloy layer, an Fe-Al-Si alloy system (sendust) or Co-Nb-Zr amorphous alloy system is suitable.

In this embodiment, the bearing surfaces 3 and 4 are made of a polycrystal material of $CaTiO_3$ ceramic system. The material is a non-magnetic polycrystal material comprising at least two kinds of phases of different composition mixed together.

In a static state upon stopping of the device the bearing surfaces 3 and 4 of FIG. 1 are in sliding contact with a magnetic disc at a central region a of the surfaces, and a region b at the front end and a region c at the rear end of the head are not in contact with the magnetic disc.

In this embodiment, the sliding contact surfaces 3 and 4 opposing to the magnetic disc, particularly, the surface of the region a is mirror-finished by polishing (to 10–40 angstrom surface roughness) and then the mirror finished sliding contact surfaces 3 and 4 are roughened by the chemical etching treatment described below.

EXAMPLE 2

Figure 2:
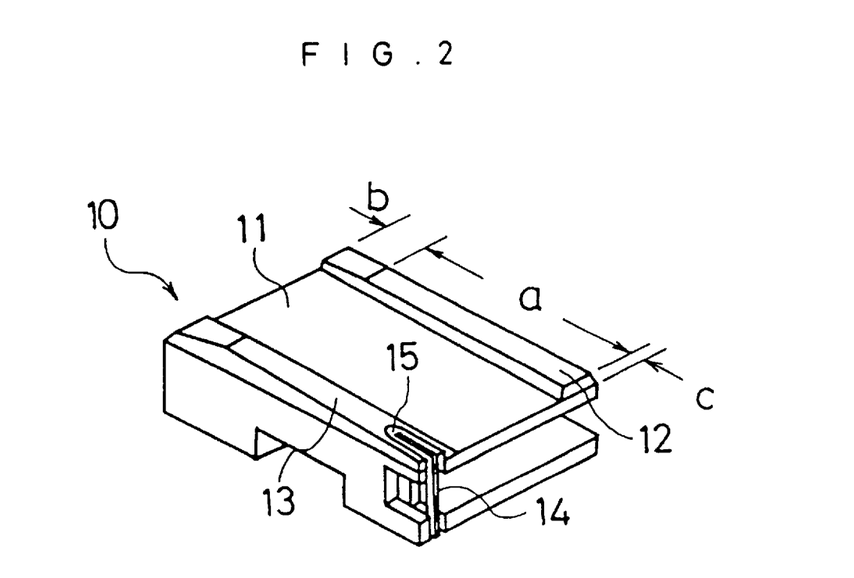
FIG. 2 is a perspective view illustrating a composite type magnetic head used in a method of a preferred embodiment according to the present invention.

This embodiment is an example for the method of surface finishing applied to a composite magnetic head 10 as shown in FIG. 2.

In the illustrated floating type magnetic head 10, ridged bearing surfaces 12 and 13 are formed in parallel with each other on an upper surface of a slider 11 and one bearing surface 13 contains a chip 14 in a slit 15 at a rear end and the chip 14 is fixed by filling glass or the like.

In this embodiment, the bearing surfaces 12 and 13 are made of a polycrystal material of $CaTiO_3$ ceramic system like in Example 1.

Figure 3:
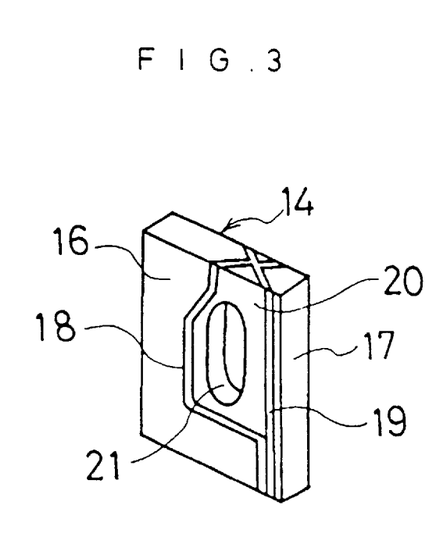
FIG. 3 is an enlarged perspective view only for a chip incorporated into the floating type magnetic head shown in FIG. 2.

As shown in FIG. 3, the chip 14 comprises a C-shaped core 16 and an I-shaped core 17 joined with glass by way of an appropriate gap. The C-shaped core 16 and the I-shaped core 17 have sputtered layers 18 and 19, respectively, formed on the upper surface thereof. A glass body 20 between both of the cores 16 and 17 has a window 21 at a central portion, and windings are applied by a predetermined number of turns passing through the window 21.

As the constituent materials for the chip 14, a polycrystal magnetic ceramic, for example, magnetic polycrystal material such as Mn-Zn ferrite or Ni-Zn ferrite is preferably used. A preferred chip material is Mn-Zn ferrite, particularly, Mn-Zn ferrite comprising a composition of MnO: 25–37%, ZnO: 8–23% and $Fe_2O_3$: 51–57%.

Further, in a static state during stopping of the device, the bearing surfaces 12 and 13 in FIG. 2 are in sliding contact with a magnetic disc at the central region a of the surfaces, but the region b at the front end and the region c at the rear end of the head are not in contact with the magnetic disc.

In this embodiment, like in Example 1, the sliding contact surfaces 12 and 13, particularly, the surfaces of the region a opposing to the magnetic disc are mirror-finished by polishing (to 10–40 angstrom surface roughness) and then the mirror-finished sliding contact surfaces 12 and 13 are roughened by the chemical etching treatment described below.

CHEMICAL ETCHING TREATMENT

The magnetic head 1 and the magnetic head 10 are dipped in an etching solution comprising an aqueous of hydrogen peroxide/ammonia solution ($H_2O_2$:$NH_4$=7:1) at a room temperature (25° C.) for a predetermined period of time, then the magnetic heads 1 and 10 are taken out of the etching solution, and the etching solution is removed from the heads 1 and 10, particularly, from the sliding contact surfaces 3 and 4 of the head 1 opposing to the magnetic disc and the sliding contact surfaces 12 and 13 of the head 10 opposing to the magnetic disc.

Result

The surface state of the sliding contact surface 3 and 4 of the magnetic head 1 and the sliding contact surfaces 12 and 13 of the magnetic head 10 before and after the chemical etching treatment were examined by an optical non-contact type surface profile measuring apparatus (model: TOPO-3D, manufactured by WYKO Co.), and a roughness curve for the surface was measured.

The roughness for the sliding contact surface was evaluated by an average center line roughness Ra determined from the roughness curve. The average center line roughness Ra is represented by the equation described below, formed by extracting a portion for a measured length L from the roughness curve along the center line thereof, taking the center line for the extracted portion on an axis X and the direction of the longitudinal factor on an axis Y and representing the roughness curve as a function of y=f(x):

$$Ra = \frac{1}{L} \int_0^L |f(x)| d(x)$$

Figure 4:
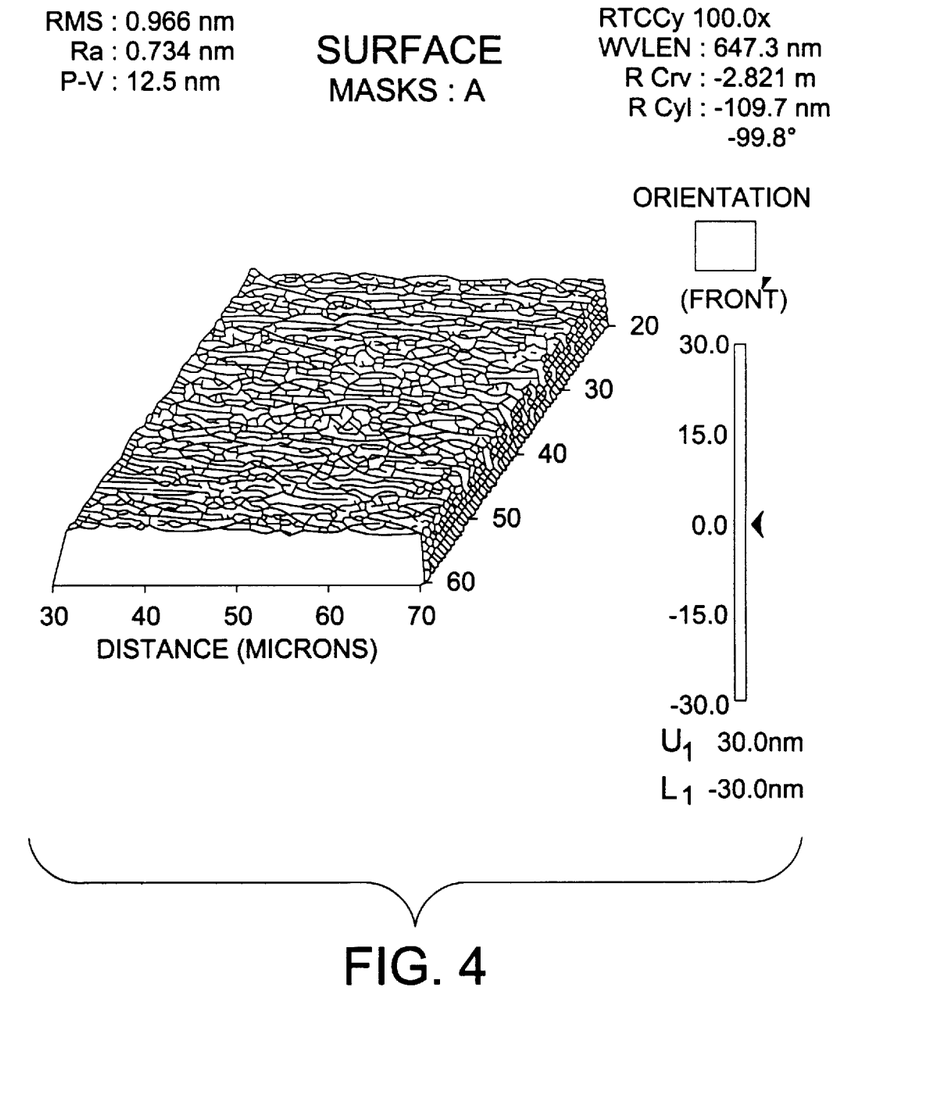
FIG. 4 is a view for the surface state of a sliding contact surface of a magnetic head opposing to a magnetic disc before chemical etching treatment in Example 1, imaged visually by an optical non-contact type surface profile measuring apparatus.
Figure 5:
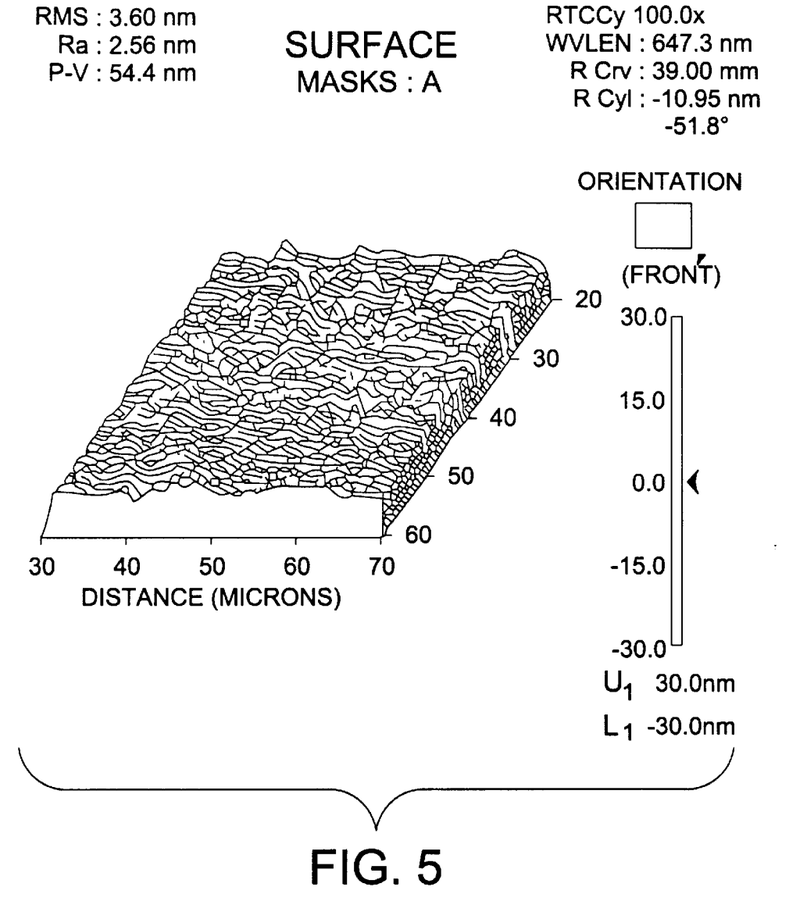
FIG. 5 is a view for the surface state of a sliding contact surface of a magnetic head opposing to a magnetic disc after chemical etching treatment in Example 1, imaged visually by an optical non-contact type surface shape measuring apparatus.

The results are shown in FIG. 4 and FIG. 5.

From the drawings, it can be seen that the sliding contact surfaces 3 and 4 of the magnetic head 1 was roughened from the average center line roughness Ra: 0.734 nm before the treatment (FIG. 4) to average center line roughness Ra: 2.56 nm (FIG. 5) after the treatment. The results were also the same as for the sliding contact surfaces 12 and 13 of the magnetic head 10.

Figure 6:
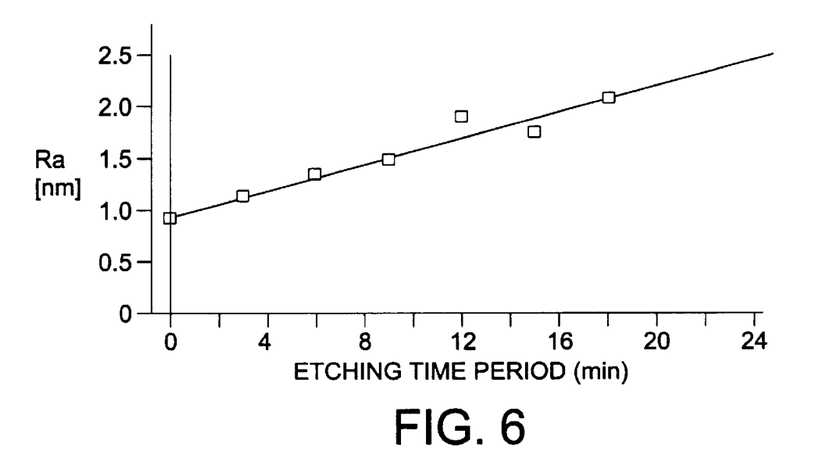
FIG. 6 is a graph illustrating a relationship between an average center line roughness Ra and a chemical etching time of the sliding contact surface of a magnetic head.

Relationship Between the Average Center Line Roughness Ra and the Etching Treatment Time The average center line roughness Ra for the sliding contact surfaces 3 and 4 of the magnetic head 1 and for the sliding contact surface 12 abd 13 of the magnetic head 10 at each time were measured by the same methods as described above while successively changing the treating time of the chemical etching. The results are shown in FIG. 6.

It can be seen from the figure that the degree of the average center line roughness Ra is substantially in proportional to the etching time. Accordingly, it has been confirmed that the degree of the height for the average center line roughness Ra can be controlled precisely by etching time.

Figure 7:
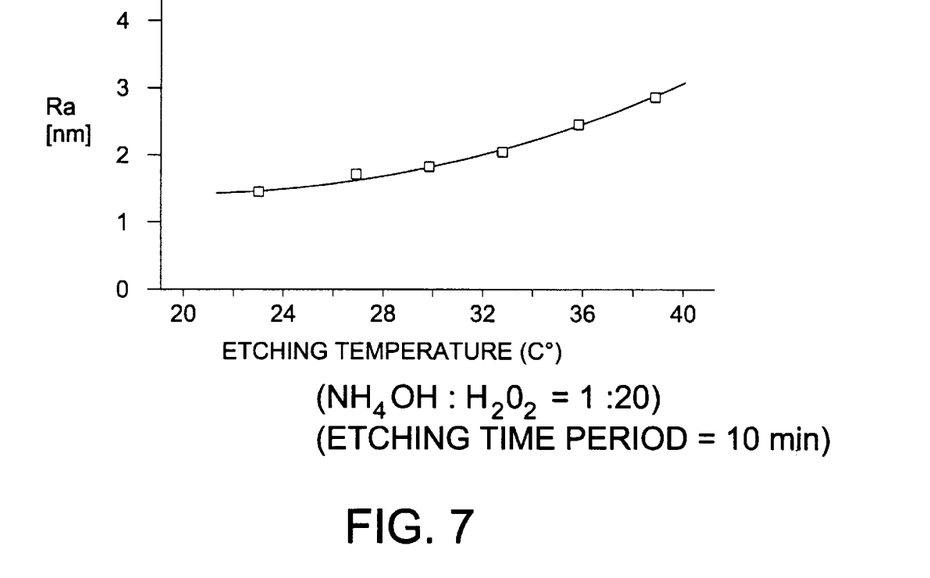
FIG. 7 is a graph illustrating a relationship between an average center line roughness Ra of a sliding contact surface of the magnetic head and temperature of the chemical etching solution.

In the chemical etching treatment using the etching solution of aqueous hydrogen peroxide/ammonia, it has been confirmed that the etching rate changes as shown in FIG. 7 depending on the temperature of the etching solution. Accordingly, the chemical etching treatment has to be applied while keeping the temperature of the etching solution constant.

Figure 8:
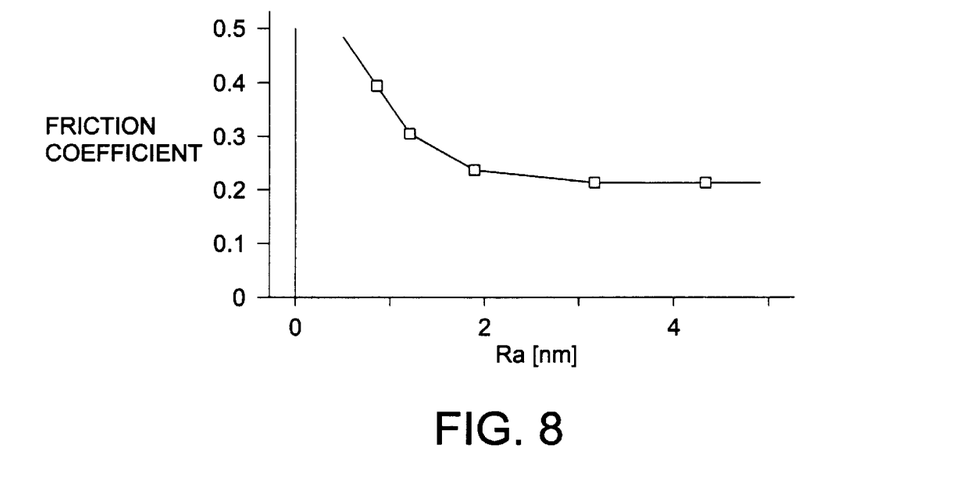
FIG. 8 is a graph illustrating a relationship between an average center line roughness Ra for the sliding contact surface of a magnetic head, and a static friction coefficient between the sliding contact surface and the surface of a magnetic disc.

Relationship Between the Average Center Line Roughness Ra and Friction Coefficient The magnetic head 1 after the surface finishing described above was incorporated into a magnetic disc device and a static frictional force generated between the sliding contact surfaces 3 and 4 of the magnetic head 1 and the surface of the magnetic disc upon starting the operation was measured respectively for each of different average center line roughness Ra, to determine a relationship between the friction coefficient and the average center line roughness Ra. The results are shown in FIG. 8.

It can be seen from the figure that the friction coefficient is decreased by increasing the average center line roughness Ra and, if the friction coefficient reaches about 0.2, the friction coefficient keeps a substantially constant value even if the value Ra exceeds about 2.5 nm.

Accordingly, it has been confirmed that the static friction coefficient of the head sliding contact surfaces 3 and 4 can be decreased easily to about 0.2 by controlling the average center line roughness Ra (that is etching time) and, accordingly, a phenomenon that the magnetic head sticks to the magnetic disc upon stopping of the device can be prevented effectively.

It has also been observed for the surface finished magnetic head 10 that the same relationship as described above is established between the average center line roughness Ra and the static friction coefficient of the sliding contact surfaces 12 and 13.

Relationship Between the Average Center Line Roughness Ra and the CSS Endurance Performance A CSS performance test was conducted on the magnetic head 1 after the surface finishing as described previously, in accordance with the following conditions (a), (b) and the number of cycles of repeating starting and stopping contacts was measured for each of different average center line roughness Ra. The results are shown in the following (c) Table 1.

(a) Tested Magnetic Disc

Substrate: Aluminum

Under layer: Cr

Magnetic layer: Co-Ni sputtered layer

Surface layer: fluoro resin lubricant (upper layer) and C sputtered layer (lower layer)

Surface Roughness: 400–600 Å

(Average center line roughness Ra: 6.5 nm)

(b) Driving condition of Magnetic Disc

Rotational speed: 3600 rpm

Rotational time per one turn: 7 sec

Stopping time between each of successive rotations: 3 sec (c)

TABLE 1

| Average Center Line Roughness (nm) | CSS Repeating Cycle (cycle) |
|---|---|
| 0.8 | 13000 |
| 1.1 | 40000 |
| 1.6 | 80000 |
| 2.1 | 100000 |
| 2.3 | 100000 |

As can be seen from Table 1, in this embodiment, at a surface roughness Ra of more than about 2.0 nm, neither defect nor abnormality occurred on both of the sliding contact surfaces 3 and 4 of the magnetic head and the surface of the magnetic disc. That is, improvement for the CSS endurance was confirmed.

Effect on the Electromagnetic Conversion Characteristic

In the magnetic head 1 after the surface finishing as described above, no corrosion with the etching solution comprising aqueous hydrogen peroxide/ammonia was observed on the core 6 composed of the magnetic material and near the vicinity thereof.

Further, no corrosion with the etching solution was observed for the chip 14 made of the magnetic material in the magnetic head 10 after surface finishing.

In addition to the absence of corrosion, a further improvement of the electromagnetic conversion characteristic was confirmed. It is assumed that such an improvement is attributable to a further surface roughening to the head sliding contact surfaces 3 and 4 and the head sliding contact surfaces 12 and 13, which effectively reduces the floating amount of the gap portion of the chip 14 relative to the magnetic disc.

Dependence on $NH_4OH/H_2O_2$ Concentration Ratio

The present inventor also conducted a chemical etching treatment in accordance with the same procedures as described previously by using the etching solutions comprising ammonia ($NH_4OH$) and hydrogen peroxide ($H_2O_2$) at different concentration ratios, and measured the surface roughness Ra for the chemical treated sliding contact surfaces 3 and 4 of magnetic head 1 and the chemically treated sliding contact surfaces 12 and 13 of the magnetic head 10.

This measurement has led to a result that the etching rate is substantially constant if the $NH_4OH/H_2O_2$ concentration is within a range from 0.03–0.2:1. Accordingly, it has been confirmed that the etching rate has no dependence on the $NH_4OH/H_2O_2$ concentration ratio.

Further, it has been confirmed that the etching rate is kept substantially constant even if the $NH_4OH/H_2O_2$ concentration is diluted to ½ ratio and that little effect of the variation of the concentration ratio on the etching rate is observed.

EXAMPLES 3–9

After mirror-finishing the side core type magnetic head 1 used in Example 1, a chemical etching treatment was conducted by the same procedures and under the same conditions as those in Example 1 by using various kinds of etching solutions (containing hydrogen peroxide as the oxidizer) to roughen the sliding contact surfaces 3 and 4 of the magnetic head 1 opposing to the magnetic disc. Then, the average center line roughness Ra at an etching time of 20 min and 90 min was determined.

Aqueous hydrogen peroxide/ammonia was used in Example 3 and the solutions shown in the following Table 2 were used, in Examples 4 to 9 as etching solutions.

The results are shown in the following Table 2.

TABLE 2

| | Etching Solution | | | |
|---|---|---|---|---|
| | Acid or alkaline solution | Oxidizer B | Ratio A/B | pH | Temperature °C. |
| Example 3 | NH4OH | $H_2O_2$ | 5/100 | 8.37 | 23.0 |
| Example 4 | 0.5N NaOH | $H_2O_2$ | 10/25 | 8.40 | 24.0 |
| Example 5 | 1N KOH | $H_2O_2$ | 6/20 | 8.39 | 23.5 |
| Example 6 | 0.01N HCl | $H_2O_2$ | 10/50 | 1.01 | 26.1 |
| Example 7 | 10N $H_3PO_4$ | $H_2O_2$ | 1/100 | 0.51 | 24.4 |
| Example 8 | 0.5M tartaric acid | $H_2O_2$ | 20/20 | 1.48 | 23.7 |
| Example 9 | 0.5M citric acid | $H_2O_2$ | 1/100 | 1.94 | 24.2 |

| | Average Center Line Roughness Ra (nm) | |
|---|---|---|
| | Etching time (20 min) | Etching time (90 min) |
| Example 3 | 2.26 | |
| Example 4 | 1.02 | 2.13 |

TABLE 2-continued

| Example 5 | 1.16 | |
| Example 6 | 0.90 | |
| Example 7 | 1.15 | 1.07 |
| Example 8 | 0.93 | 1.58 |
| Example 9 | 1.23 | 1.34 |

As shown in the table, examples 4 to 9, whose sliding surfaces 3 and 4 of the magnetic head 1 were finished to have a high average center line roughness Ra, show sufficient CSS characteristic and satisfactory electromagnetic performance was obtained, as in Example 3. However, the etching rates of the examples were lower than that in Example 3.

EXAMPLES 10–12

The embodiments are examples of applying mirror-finishing and then chemical etching treatment by the same procedures and under the same conditions as those in the method of Example 1 for the same kind of the side core type magnetic head 1 as used in Example 1, except that the head sliding contact surfaces 3, 4 and 5 are made of a polycrystal material of AlTiC ceramic system (Example 10), MnO-NiO (Example 11) and $CaTiO_3$-NiO ceramic system (Example 12).

Also in these examples, the sliding contact surfaces 3 and 4 were finished to have a high average center line roughness Ra, good electromagnetic performance as well as satisfactory CSS performance were obtained like in Example 1.

As apparent from the foregoing descriptions according to the present invention, the sliding contact surface of a floating type magnetic head made of a polycrystal material comprising at least two kind of phases of different compositions (non-magnetic polycrystal ceramic) mixed together and opposing to the magnetic recording medium can be finished to a mirror face having an appropriate surface roughness, accordingly, satisfactory CSS performance can be ensured and satisfactory electromagnetic performance can be obtained at the same time.

Further the present invention can provide a floating type magnetic head applied with such surface finishing.

What is claimed is:

1. A method of etching a composite floating magnetic head, comprising:

roughening only an air bearing surface of said composite floating magnetic head with an etching solution comprising a mixture of an acid or alkaline solution and aqueous hydrogen peroxide as an oxidizing agent;

wherein said composite floating magnetic head comprises a slider made of non-magnetic polycrystal ceramic material and a magnetic head core made of ferrite disposed to the side of the slider;

wherein said slider is made of a non-magnetic polycrystal ceramic material selected from the group consisting of $CaTCO_3$ ceramic system, AlTiC ceramic system and MNO-NiO ceramic system.

2. The method of etching according to claim 1, wherein said etching solution is an aqueous hydrogen peroxide and ammonia solution.

3. The method for etching according to claim 1, wherein said magnetic head core is treated with said etching solution, but is not etched.

4. The method according to claim 1, wherein said acid or alkaline solution is selected from the group consisting of solution of hydrochloric acid, tartaric acid, citric acid, potassium hydroxide, sodium hydroxide and ammonia.

5. The method according to claim 1 wherein said polycrystal ceramic material is $CaTiO_3$.

* * * * *